United States Patent [19]

Castagnos et al.

[11] Patent Number: 5,490,892
[45] Date of Patent: Feb. 13, 1996

[54] METHOD OF FABRICATING A COMPOSITE MATERIAL PART, IN PARTICULAR A SANDWICH PANEL, FROM A PLURALITY OF ASSEMBLED-TOGETHER PREFORMS

[75] Inventors: Stéphane Castagnos, Carbon Blanc; Jean-Louis Limousin, Le Plan Medoc, both of France

[73] Assignee: Societe Europeenne De Propulsion, Suresnes, France

[21] Appl. No.: 197,638

[22] Filed: Feb. 15, 1994

[30] Foreign Application Priority Data

Feb. 17, 1993 [FR] France .................................. 93 01767

[51] Int. Cl.⁶ .............................. B32B 5/06; B32B 5/12; B32B 18/00; C01B 31/00
[52] U.S. Cl. .............................. 156/89; 156/82; 156/148; 156/249; 264/29.5; 423/447.2; 428/234; 428/300
[58] Field of Search .................................. 156/62.6, 62.8, 156/148, 89, 72, 82, 285, 247, 249, 296, 292; 264/29.1, 29.5, 56, 136; 28/107, 111, 112; 428/300, 234; 427/228, 249, 248.1; 423/447.1, 447.2, 447.3, 447.4

[56] References Cited

U.S. PATENT DOCUMENTS

| 3,895,084 | 7/1975 | Bauer | 264/29.1 |
|---|---|---|---|
| 3,900,650 | 8/1975 | Sedore | 428/86 |
| 3,994,762 | 11/1976 | Wrzesien et al. | 156/148 |
| 4,790,052 | 12/1988 | Olry | 28/110 |
| 4,983,451 | 1/1991 | Sugino et al. | 156/148 X |
| 5,041,321 | 8/1991 | Bendig | 264/136 X |
| 5,160,471 | 11/1992 | Vives et al. | 264/136 |

FOREIGN PATENT DOCUMENTS

| 0051535 | 5/1982 | European Pat. Off. |
|---|---|---|
| 2189207 | 12/1977 | France . |
| 2584106 | 1/1987 | France . |
| 2660591 | 10/1991 | France . |
| 2691923 | 12/1993 | France . |
| 1387868 | 3/1975 | United Kingdom . |
| 2040805 | 9/1980 | United Kingdom . |
| 1590827 | 6/1981 | United Kingdom . |
| 2088282 | 6/1982 | United Kingdom . |

Primary Examiner—Michael W. Ball
Assistant Examiner—Francis J. Lorin
Attorney, Agent, or Firm—Weingarten, Schurgin, Gagnebin & Hayes

[57] ABSTRACT

Distinct preforms are made for different portions of a composite material part that is to be fabricated, and they are assembled together in a non-densified state or in a state that is not completely densified by uniting respective contacting surfaces of the preforms (13, 15, 36) together by means of fibrils (17, 19) projecting perpendicularly from the surface of one of the preforms (13, 15) and in which the surface of another preform (36) is engaged. The assembled-together preforms are then co-densified. The fibrils are formed on the surface of a fiber preform by the ends of fibers thereof that have been displaced by the preform being needled. The method is particularly suitable for fabricating a sandwich panel of composite material comprising two rigid skins between which there is disposed a core constituted by partitions that are perpendicular to the skins.

14 Claims, 3 Drawing Sheets

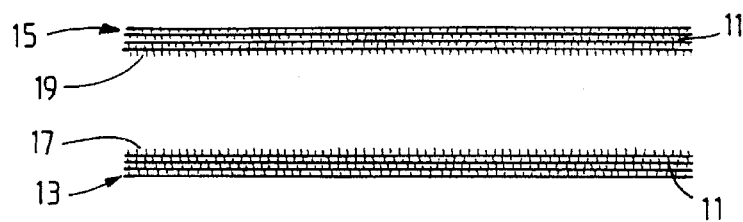
FIG.4A
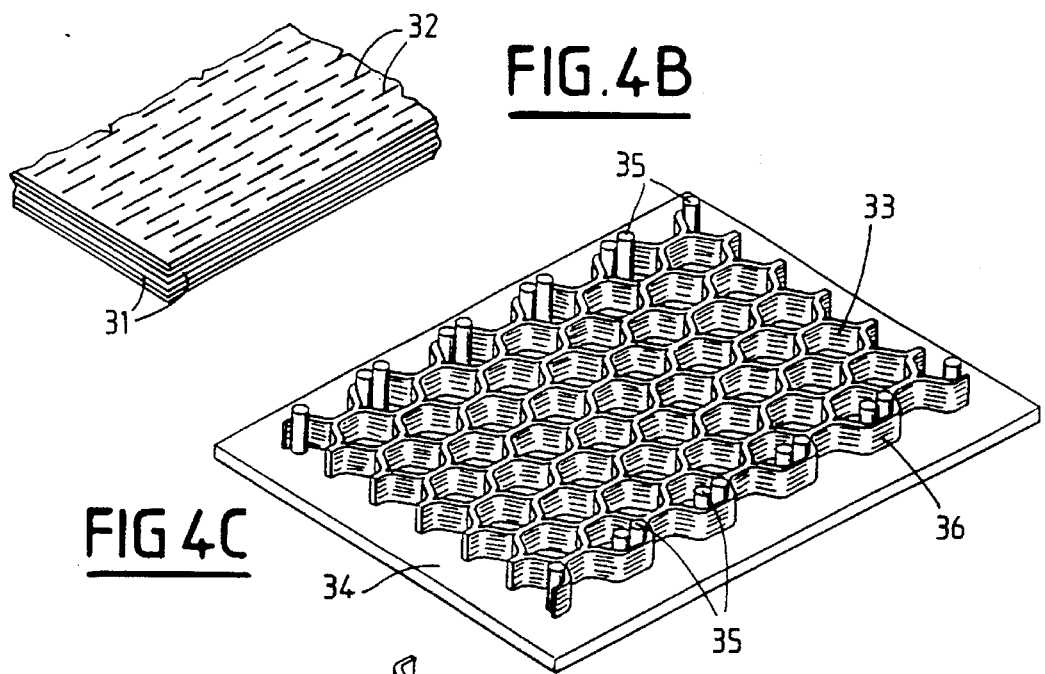
FIG.4B
FIG 4C
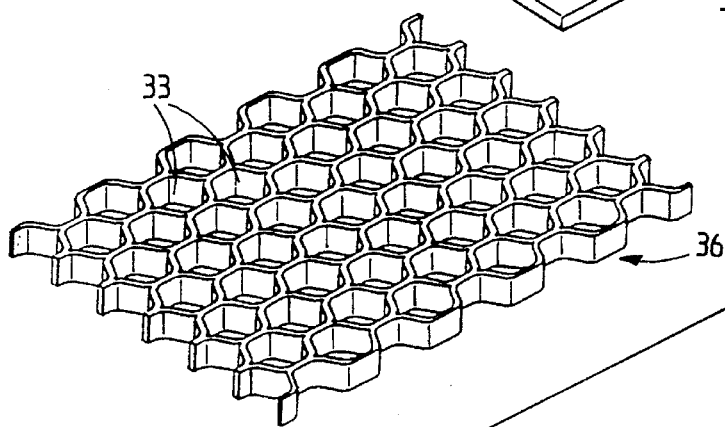
FIG.4D
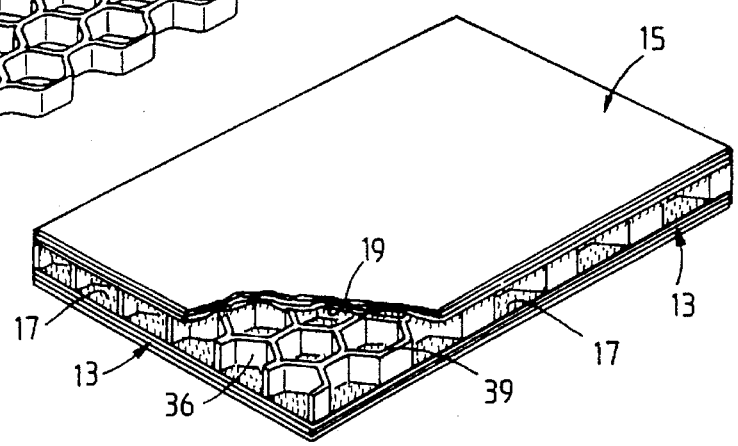
FIG 4E

METHOD OF FABRICATING A COMPOSITE MATERIAL PART, IN PARTICULAR A SANDWICH PANEL, FROM A PLURALITY OF ASSEMBLED-TOGETHER PREFORMS

FIELD OF THE INVENTION

The present invention relates to a method of fabricating a composite material part from a plurality of preforms that are assembled together and densified by means of a matrix.

A particular, but non-exclusive, field of application for the invention is that of fabricating sandwich panels of thermostructural composite material.

BACKGROUND OF THE INVENTION

The term "sandwich panel" is used herein to designate a part constituted by two thin covering faces or "skins" that are interconnected by a core disposed between the two faces. The core is made up of stiffening partitions that extend perpendicularly to the skins and that define cells between one another. Various types of cellular cores are well known, e.g. honeycomb cores, corrugated cores, tubular cores, cup cores, . . .

In the field of cold composites, methods of bonding by means of adhesive between the skins and the core are commonly performed.

The same is not true of thermostructural composite material, i.e. materials such as carbon-carbon composites or ceramic matrix composites that have mechanical properties making them suitable for constituting structural elements and that are capable of conserving those properties at high temperatures.

There is a need for sandwich panels made of thermostructural composite materials, in particular in aviation and space applications, e.g. to constitute structural parts of space planes, hypersonic planes, or combined-propulsion planes.

Other applications can be envisaged, in particular for the blades and vanes of turbines, mirror supports having great dimensional stability, fairings suitable for being exposed to large heat flows, or fire-break partitions in aviation, marine, or land applications.

Various methods are indeed known that enable parts of complex shape to be fabricated from thermostructural composite material, by making separate preforms for different portions of such parts, assembling the preforms in a non-densified or an incompletely densified state, and then co-densifying the assembled-together preforms.

A known method for the making of sandwich panels, described in particular in Document EP-A-0 051 535, consists in depositing a thermolysable bonding agent by coating it between the facing faces of the preforms for the skins and for the core, before they have been fully densified, and then in thermoliyzing the bonding agent and co-densifying the skins, the core, and the bonding agent. That method suffers from the drawback of not enabling bonding quality to be controlled uniformly, where said quality is a function of the bonding agent used and of the specific surface area of bonding. In addition, the mass of the panel is increased by the presence of the bonding agent.

Another known method consists in implementing a textile type union by stitching or by implanting fibers, however a high density of stitches is required in order to avoid concentrating stresses at any particular stitch and in order to provide sufficient bonding.

It is also possible to consider a mechanical assembling of the differents components of a composite material part, for example by means of screws, possibly after the component preforms have been densified. Unions made in that way are effective, but they apply at points only. In the case of sandwhich panels, reducing stress concentrations means that complex interface shapes are required between the screws and the skins, together with the presence of inserts.

In another known process, described in document GB-A-1 387 868, the bonding of two components of a composite material part (fiber reinforced polyester) can be achieved by inserting a reinforcing element in the form of a film bearing a plurality of rigid needles extending perpendicularly to its surface. This type of uniting requires then a supplementary element which has to be separately manufactured.

Finally, in the making of a preform by superposition of plane fabric layers, a process is described in document FR-A-2 189 207 which consists in treating the surface of the fabric by abrasion to allow fibers to loosen. The number of contact points between fabric layers is thereby increased, which constitute growing points for the material constituting the matrix upon subsequent densification of the preform. An increased resistance to delamination in thus achieved This process is applied to elements of a preform, not to the uniting of already realized preforms. In addition a specific operation step is required, namely surface abrasion of the fabric layers, which has a destructive effect.

OBJECTS AND SUMMARY OF THE PRESENT INVENTION

Thus, an object of the present invention is to provide a method making it possible in a manner that is simple and cheap to provide effective and uniform uniting between preforms for different portions of a part made of composite material, prior to co-densification thereof.

Another object of the invention is to provide such a method that is particularly suited to fabricating a sandwich panel of thermostructural composite material by assembling together and co-densifying preforms for the skins and for the core of the panel.

According to the invention, a method of fabricating a material composite part comprises:

making distinct preforms for different portions of the part, at least one of the preforms being a needled fiber preform and showing fibrils projecting substantially perpendicularly from a surface of the preform, said fibrils being formed by ends of fibers that have been displaced by needling the preform;

assembling the preforms together while they are in a non-densified state or a state that is not completely densified, with two preforms being assembled together at least in part by the respective surfaces in contact of the two preforms uniting by means of said fibrils projecting from the surface of at least one of the two preforms and in which the surface of the other preform engages; and co-densifying the assembled-together preforms.

Thus, advantage is taken for forming the fibrils of a needling step which is carried out for making the preform, no additional specific operation being necessary.

The preform may be needled onto a substrate which is subsequently separated from the preform to reveal the ends of the fibers of the preform that have been entrained into the substrate during needling, thereby forming the fibrils.

In a variant, for a preform that is made up of superposed two-dimensional fiber plies that are needled together, at least one of the surface plies of said preform is peeled off to reveal the ends of the fibers that have been entrained into said ply during needling, thereby forming the fibrils.

Both of the surfaces in contact of two respective preforms may have projecting fibrils, such that the preforms can be assembled together, at least in part, by mutual engagement of said surfaces due to the fibrils that they present.

The method of the invention as defined above is particularly suitable for making sandwich panels of thermostructural composite material. In which case, the assembly between the fibrous skin preform and the core preform is made at least in part by means of fibrils that project perpendicularly from the surface of the preform for the skin and in which the ends of the partitions of the core preform are engaged, the fibrils being formed at the surface of the fibrous preform for the skin by ends of fibers thereof that have been displaced by needling the preform.

Other features and advantages of the method of the invention appear on reading the following description by way of non-limiting indication, and made with reference to the accompanying drawings, in which:

FIG. 4A to 4E show various stages in another variant implementation of the method of the invention for fabricating the panel of FIG. 1.

MORE DETAILED DESCRIPTION

Figure 1:
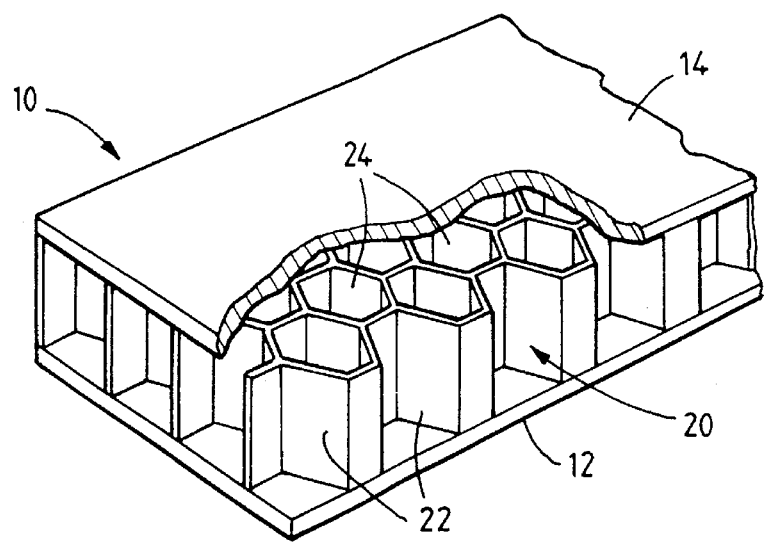
FIG. 1 is a diagrammatic perspective view of a portion of a sandwich panel.

FIG. 1 shows a panel 10 of thermostructural composite material, e.g. a carbon-carbon composite (carbon reinforcing fibers densified by a carbon matrix) or a ceramic matrix composite (refractory-carbon or ceramic-reinforcing fibers densified by a ceramic matrix).

The panel 10 has two coverings or skins 12, 14 and a cellular core formed by partitions 22 that extend perpendicularly between the skins 12 and 14. In this example, the cells 24 defined by the partitions 22 are honeycomb-shaped, but other shapes are naturally possible.

In order to fabricate the panel 10, different fiber preforms are made for the skins 12 and 14, and for the core 20.

Figure 2A:
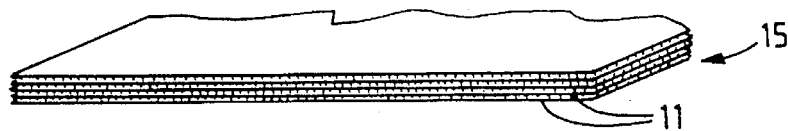
FIGS. 2A to 2F show various stages in one implementation of the method of the invention for fabricating the panel of FIG. 1.

The preforms 13 and 15 for the skins are formed by draping (stacking) two-dimensional fiber plies 11 (FIG. 2A). For example, the plies 11 are made up of layers of cloth, or of sheets of cables, optionally with interposed webs of fibers. The plies 11 are made of carbon fibers or of fibers made of a precursor of carbon such as polyacrylonitrile (PAN) peroxide. The number of plies 11 is chosen as a function of the thickness desired for the skins. The plies 11 are united together by needling. A method for needing together plies that are stacked flat is described in Document FR-A-2 584 106, in particular.

The effect of needling the plies together is to pull fibers from the plies 11 or from the webs of fibers interposed between them and to dispose those fibers perpendicularly to the plies.

Figure 2B:
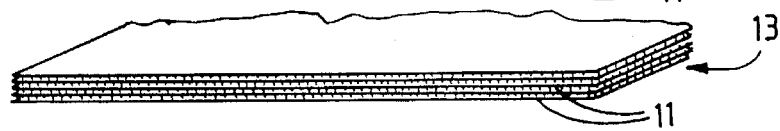

After needling, at least one surface ply 11a is "peeled" off the remainder of the preform 13 (FIG. 2B). The ends of the fibers that were inserted in the ply 11a during needling then form fibrils 16 projecting perpendicularly from the surface of the preform 13. Similarly, at least one surface ply 11b is peeled from the remainder of the preform 15, leaving fibrils 19.

Figure 2C:
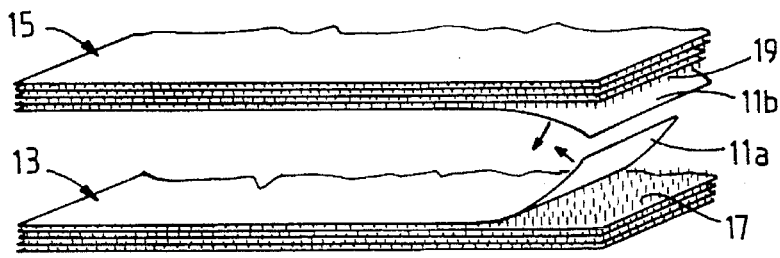

The preform for the core 20 is made from fluted sheets obtained by draping and molding layers of cloth 21 that are preimpregnated with a resin (FIG. 2C). The quantity of resin used is sufficient to ensure that after cross-linking and pyrolysis the fluted sheet preforms are held together (consolidated) but are not completely densified.

Figure 2D:
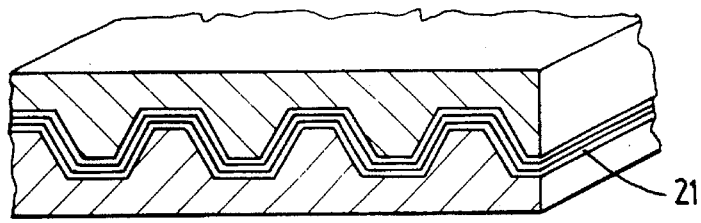

The fluted sheets 23 obtained after the resin has been cross-linked are assembled together to form a block 25 having cells 26 (FIG. 2D). Assembly may be performed, for example, by adhesion between the contacting walls of the sheets 23, obtained by means of the resin used for impregnating the layers of cloth 21. The block 25 is cut to give cells of a length corresponding to the thickness desired for the panel (spacing between the skins). A partially densified preform for the core 20 is thus obtained.

Figure 2E:
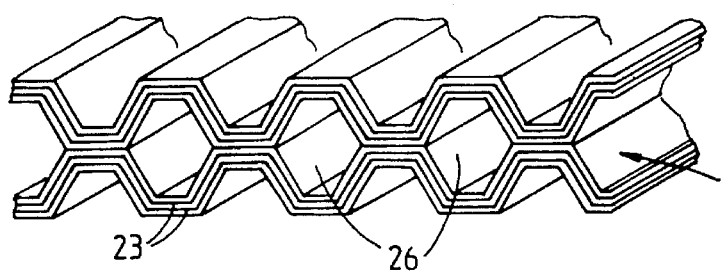
Figure 2F:
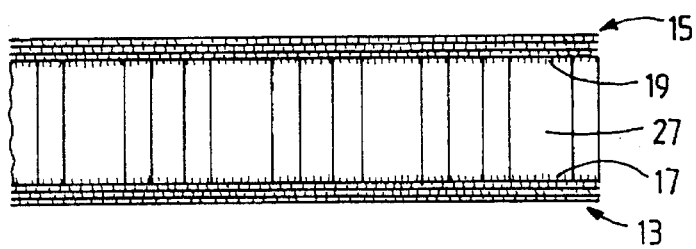

The preform 27 obtained in this way is inserted between the surfaces of the performs 13 and 15 having the fibrils 17 and 19 (FIG. 2E). As shown in greater detail in FIG. 2F, each portion 29 of the preform 27 corresponding to a core partition 22 extends perpendicularly to the surfaces of the preforms 13 and 15. The edges of the portions 29 of the preform are engaged in amongst the fibrils 17.

The preforms 13, 15, and 27 assembled together in this way are co-densified by the matrix-constituting material (carbon or ceramic). Co-densification is performed by chemical vapor infiltration. The techniques of carbon or ceramic chemical vapor infiltration are well known. After densification, a panel is obtained similar to that shown in FIG. 1.

The resin impregnating the layers of cloth 21 is pyrolyzed and the sheets 23 are caused to adhere to one another prior to co-densification. The same applies to carbonizing the fibers constituting the plies 11 and/or the layers 21 when said fibers are not made of carbon but of a precursor for carbon. When a precursor is used, carbonization may be performed on the preforms 13, 15, 27 prior to their assembly, and even before peeling off the plies 11a and 11b.

In the above description, the fibrils of the preforms 13 and 15 are stood up by peeling off one or more plies 11.

The plies that are to be peeled off could be replaced by a substrate to which the remaining plies are needled. When the fibers of the preforms 13, 15 are constituted by a precursor of carbon, the substrate may be constituted, for example, by one or more layers of carbon cloth. However when the fibers of the preform 13, 15 are already constituted by carbon, so that no preform carbonization is required, then the substrate may be constituted by one or more sheets of polyethylene.

The assembling together of the preforms by means of the fibrils may be associated with bonding on a shaper, using a method similar to that described in Document FR-A-2 660 591.

Figure 3:
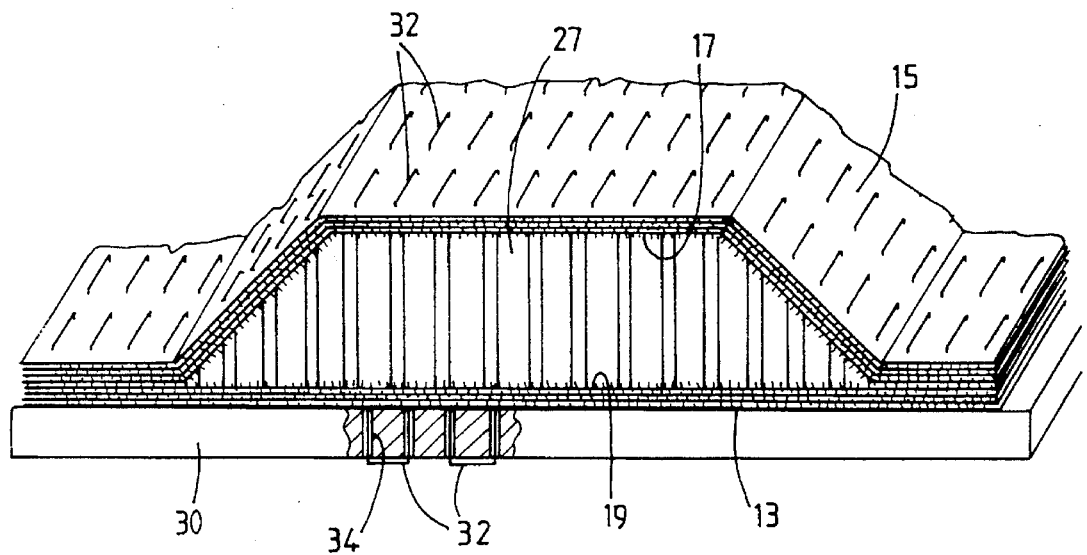
FIG. 3 shows a variant implementation of the method of the invention.

In the example shown in FIG. 3, the assembly constituted by the preform 13, the preform 27, and the preform 15 is applied to the plane top face of a shaper 30 by uniting threads 32. In this example, the preform 27 is trapezium shaped, with the preforms 13 and 15 coming together on either side of the preform 27, uniting between the terminal portions of the preforms 13 and 15 being provided by mutual engagement between the fibrils of their surfaces in contact.

The uniting threads 32 pass through the preform 15, into the cells of the preform 27, through the preform 13, and into holes 34 in the shaper 30, thereby forming parallel lines of stitching.

Various shapes can be given to the sandwich structure, including tubular shapes, in which case the skins form two coaxial tubes with the core extending between them and having radial cells.

Another implementation of the method of the invention for fabricating a panel as shown in FIG. 1 is illustrated in FIGS. 4A to 4E.

The preforms 13 and 15 for the skins of the panel are obtained as described above, with the fibrils 17, 19 being stood up by peeling off one or more surface plies (FIG. 4A).

The cellular preform for the core of the panel is fabricated as described in FR-A-2 691 923 entitled "Structure en nid d'abeilles en matériau composite thermostructural et son procédé de fabrication" [Honeycomb structure of thermostructural composite material, and method of fabrication] and corresponding to U.S. patent application Ser. No. 068,738, filed May 28, 1993.

In summary, two-dimensional fiber plies 31 are superposed and united together by needling. Slot-shaped cutouts 32 are made in a staggered configuration with the dimensions and the locations of the slots defining the dimensions and the shapes of the cells. The cutouts are made in mutually parallel planes perpendicular to the planes of the plies (FIG. 4B).

After the slots have been cut, the preform is stretched perpendicularly to the planes of the slots (FIG. 4C), thereby forming the cells 33.

After stretching, the resulting preform 36 is densified while being held in the stretched state by means of jig constituted by a soleplate 34 and by pegs 35 that are engaged in the cells 33.

The assembly constituted by the jig 34, 35 and the preform 36 is inserted into an oven in which the preform is partially densified by chemical vapor infiltration. Just sufficient densification is performed to consolidate the preform so it retains its shape after the jig has been removed (FIG. 4D).

Preform 36 is inserted between the preforms 13 and 15. The ends of the walls of the cells 33 engage in the fibrils 17 and 19 present on the preforms 13 and 15 (FIG. 4E).

The preforms assembled together in this way are subjected to co-densification by chemical vapor infiltration thus providing the desired panel.

In the above, the fibrils present on the surface of at least one of the preforms to be assembled together are constituted by fibers of the non-densified preform. In order to confer greater rigidity to the fibrils, it is possible to consolidate them before assembling the preforms together. To this end, the, or each, preform provided with fibrils is partially densified. This partial densification may be performed by using a liquid, i.e. impregnation by means of a resin followed by pyrolysis, or by using a gas, i.e. chemical vapor infiltration. Consolidation of fiber preforms is an operation that is known per se, and is commonly performed for achieving minimum cohesion between the fibers to enable the preform to be handled while conserving its shape without assistance from a shape-maintaining jig.

Fibers made rigid in this way behave substantially like pins, ensuring more effective engagement between the contacting surfaces of the assembled-together preforms.

The pins are sufficiently rigid for it to be possible to envisage assembling preforms having such pins together with preforms that are not fiber preforms, e.g. preforms constituted by foams, providing the pins can penetrate into the surface thereof, with assembly being finished off, as before, by co-densification.

Thus, in the fabrication of a sandwich panel, the rigid fibrils obtained by consolidating the skin preforms by partial densification can be engaged in the surface of a core preform that is not made in the form of a fibrous textile, but made in the form of a low density block of foam to which the skin preforms are assembled prior to co-densification.

We claim:

1. A method of fabricating a composite material part, the method comprising the steps of:

providing at least two distinct preforms each corresponding to a respective portion of the part, at least one of the preforms being a fiber preform formed by the step of needling said fiber preform onto a substrate with ends of fibers that have been entrained during needling extending into the substrate;

separating the substrate from the needled preform, thereby providing said ends of fibers as fibrils that project substantially perpendicularly from a surface of the needled preform;

assembling said at least two preforms together while they are in a non-densified state or a state that is not completely densified, with the preforms being assembled together at least in part by means of said fibrils projecting from said surface of the previously needled preform and engaging a contacting surface of the other preform; and co-densifying the assembled together preforms.

2. A method according to claim 1, wherein each of said at least two preforms has fibrils that project substantially perpendicularly from a surface of the preform, and said at least two preforms are assembled together by bringing said surfaces into mutual engagement by means of said fibrils projecting from each of said surfaces.

3. A method according to claim 1, wherein said fibrils are rigidified by consolidating the preform carrying the fibrils by partial densification, prior to assembling the preforms together.

4. A method of fabricating a composite material part, the method comprising the steps of:

providing at least two distinct preforms each corresponding to a respective portion of the part, at least one of the preforms being a fiber preform made up of superposed two-dimensional fiber plies formed by the step of needling said superposed two-dimensional fiber plies together;

peeling off at least one of the surface plies of said needled preform to provide ends of fibers as fibrils that have been entrained into said at least one ply during needling, and that project substantially perpendicularly from a surface of the needled preform;

assembling said at least two preforms together while they are in a non-densified state or a state that is not completely densified, with the preforms being assembled together at least in part by means of said fibrils projecting from said surface of the previously needled preform and engaging a contacting surface of the other preform; and co-densifying the assembled together preforms.

5. A method according to claim 4, wherein each of said at least two preforms has fibrils that project substantially perpendicularly from a surface of the preform, and said at least two preforms are assembled together by bringing said surfaces into mutual engagement by means of said fibrils projecting from each of said surfaces.

6. A method according to claim 4, wherein said fibrils are rigidified by consolidating the preform carrying the fibrils by partial densification, prior to assembling the preforms together.

7. A method of fabricating a sandwich panel of composite material, the panel comprising two rigid skins between which a core is disposed, the core being constituted by partitions extending perpendicularly to the skins, the method comprising the steps of:

provideing distinct preforms for the skins and for the core of the panel, at least one of the skin preforms being a fiber preform formed by the step of needling said fiber preform onto a substrate with ends of fibers that have been entrained during needling extending into the substrate;

separating the substrate from the needled preform, thereby providing said ends of fibers as fibrils that project perpendicularly from a surface of the needled skin preform;

assembling together the preforms in a non-densified state or in a state that is not completely densified with said at least one previously needled skin preform and said core preform being assembled together at least in part by means of said fibrils projecting from said surface of the needled skin preform and engaging ends of partitions of said core preform; and co-densifying the assembled together preforms.

8. A method according to claim 7, wherein said fibrils are rigidified by consolidating the preform carrying the fibrils by partial densification, prior to assembling the preforms together.

9. A method according to claim 7, wherein the skin preforms and the core preform are additionally assembled together by fixing the assembly together on a shaper.

10. A method of fabricating a sandwich panel of composite material, the panel comprising two rigid skins between which a core is disposed, the core being constituted by partitions extending perpendicularly to the skins, the method comprising the steps of:

providing distinct preforms for the skins and for the core of the panel, at least one of the skin preforms being a fiber preform formed by the step of needling said superposed two-dimensional fiber plies together;

peeling off at least one of the surface plies of said needled preform to provide ends of fibers as fibrils that have been entrained into said at least one ply during needling, and that project perpendicularly from a surface of the needled skin preform;

assembling together the preforms in a non-densified state or in a state that is not completely densified with said at least one previously needled skin preform and said core preform being assembled together at least in part by means of said fibrils projecting from said surface of the needled skin preform and engaging ends of partitions of said core preform; and co-densifying the assembled together preforms.

11. A method according to claim 10, wherein said fibrils are rigidified by consolidating the preform carrying the fibrils by partial densification, prior to assembling the preforms together.

12. A method according to claim 10, the skin preforms and the core preform are additionally assembled together by fixing the assembly together on a shaper.

13. A method of fabricating a sandwich panel of composite material, the panel comprising two rigid skins between which a core is disposed, the method comprising the steps of:

providing distinct preforms for the skins and for the core of the panel, with the core preform being formed from a foam and each of the skin preform being a fiber preform formed by the step of needling said fiber preform onto a substrate with ends of fibers that have been entrained during needling extending into the substrate;

separating the substrate from the needled preform for each skin preform, thereby providing said ends of fibers as fibrils that project perpendicularly from a surface of each needled skin preform;

rigidifying said fibrils by consolidating the preforms carrying the fibrils by partial densification;

assembling together at least in part by means of said rigid fibrils projecting from said surfaces of the previously needled skin preforms and engaging with said foam core preform; and co-densifying the assembled-together preforms.

14. A method of fabricating a sandwich panel of composite material, the panel comprising two rigid skins between which a core is disposed, the method comprising the steps of:

providing distinct preforms for the skins and for the core of the panel, with the core preform being formed from a foam and each of the skin preform being a fiber preform formed by the step of needling said superposed two-dimensional fiber plies together;

peeling off at least one of the surface plies of each needled preform to reveal ends of fibers that have been entrained into said at least one ply during needling, thereby providing said ends of fibers as fibrils that project perpendicularly from a surface of each needled skin preform;

rigidifying said fibrils by consolidating the preforms carrying the fibrils by partial densification;

assembling together said skin preforms and core preform being assembled together at least in part by means of said rigid fibrils projecting from said surfaces of the previously needled skin preforms and engaging with said foam core preform; and co-densifying the assembled-together preforms.

\* \* \* \* \*